(12) United States Patent
Nakama et al.

(10) Patent No.: US 6,974,264 B2
(45) Date of Patent: Dec. 13, 2005

(54) OPTICAL MODULE AND METHOD FOR PRODUCING THE SAME

(75) Inventors: Kenichi Nakama, Osaka (JP); Tsuyoshi Yamane, Osaka (JP); Shigeki Nagasaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 251 days.

(21) Appl. No.: 10/093,060

(22) Filed: Mar. 8, 2002

(65) Prior Publication Data

US 2002/0131732 A1 Sep. 19, 2002

(30) Foreign Application Priority Data

Mar. 13, 2001 (JP) .................................... P2001-070701
Mar. 13, 2001 (JP) .................................... P2001-070749

(51) Int. Cl.[7] .......................... G02B 6/32; G02B 6/34; G02B 6/43
(52) U.S. Cl. ............................ 385/92; 385/93; 385/31; 385/33; 385/36
(58) Field of Search ........................ 385/31, 33, 36, 385/88–94, 134, 139

(56) References Cited

U.S. PATENT DOCUMENTS

| 4,215,937 | A | * | 8/1980 | Borsuk ....................... 356/73.1 |
| 5,446,750 | A | | 8/1995 | Ohtsuka et al. |
| 5,764,833 | A | * | 6/1998 | Kakii et al. ..................... 385/54 |
| 5,797,475 | A | * | 8/1998 | Bointon et al. ............. 194/317 |
| 5,963,684 | A | | 10/1999 | Ford et al. ..................... 385/33 |
| 5,991,058 | A | * | 11/1999 | Feuer et al. ................... 385/33 |
| 6,632,027 | B1 | | 10/2003 | Yoshida et al. |

FOREIGN PATENT DOCUMENTS

| EP | 02 00 5319 | 9/2002 | |
| JP | 07230020 | 8/1995 | |
| JP | 07230020 A | * 8/1995 | ............ G02B/6/30 |
| JP | 09101430 | 10/1995 | |
| JP | 09026531 | 1/1997 | |
| JP | 09-026531 | 1/1997 | |
| JP | 09-73020 | 3/1997 | |
| JP | 9-101430 | 4/1997 | |
| JP | 11153724 | 6/1999 | |
| JP | 11-153724 | 8/1999 | |
| JP | 2000-56190 | 2/2000 | |

OTHER PUBLICATIONS

Patent Abstract 07230020, dated Feb. 16, 1994, titled Optical Module.
Patent Abstract 200056190, dated Aug. 1, 1998. titled Optical Module.
EPO Communication dated Jun. 24, 2002.
Patent Abstract 09101430, dated Apr. 10, 1995, titled Optical Module.
Patent Abstract 09026531 dated Dec. 7, 1997 titled Casing of Optical Module and its Production.
European Search Report dated Feb. 3, 2005.

* cited by examiner

*Primary Examiner*—Akm Enayet Ullah
*Assistant Examiner*—Omar Rojas
(74) *Attorney, Agent, or Firm*—Whitham, Curtis & Christofferson, PC

(57) ABSTRACT

In a small-sized optical module, opposite side surfaces of a collimator lens (2) and opposite side surfaces of a polarization compensating filter (5) are fixed to opposite side surfaces of a rectangular frame (4). Two open surfaces are provided in the rectangular frame (4), so that optical components can be finely adjusted easily, and a large number of small-sized optical components can be aligned and assembled accurately. Reinforcing members (6) are provided in the open surfaces of the rectangular frame (4) so that the shape of the rectangular frame (4) can be retained against external force. After a diffraction grating (3) is fixed to the reinforcing members (6), the reinforcing members (6) with the diffraction grating (3) are adjusted, aligned and fixed to the rectangular frame (4).

28 Claims, 8 Drawing Sheets

OPTICAL MODULE AND METHOD FOR PRODUCING THE SAME

BACKGROUND OF THE INVENTION

The present invention relates to an optical module and a method for producing the optical module, and particularly relates to an optical module of a micro-optics type constituted by a lens, a diffraction grating, a filter, and so on, and a method for producing the optical module.

A micro-optics type optical module is disclosed, for example, in Japanese Patent Laid-Open No. 73020/1997. Micro optical elements such as a lens, a plane mirror, a concave mirror, a filter, a diffraction grating and a prism are individually aligned and fixed to the bottom surface of a box-shaped package having one surface opened. Alternatively, the micro optical elements are aligned and fixed to a plane base.

Figure 6A:
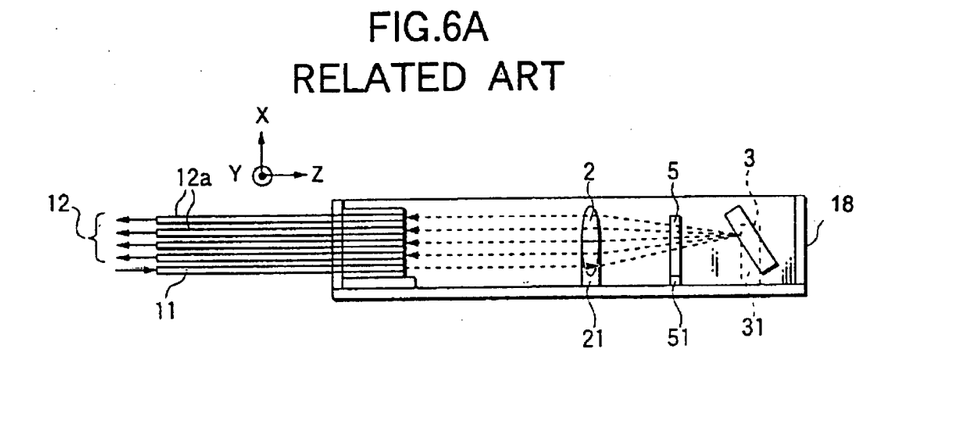
FIGS. 6A and 6B are a side sectional view and a plan view showing the configuration of a related-art optical module.
Figure 6B:
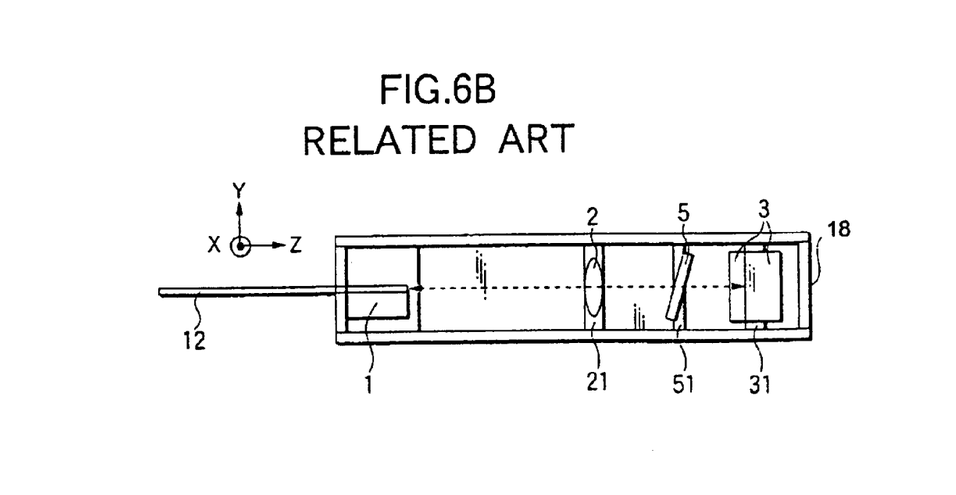
Figure 7A:
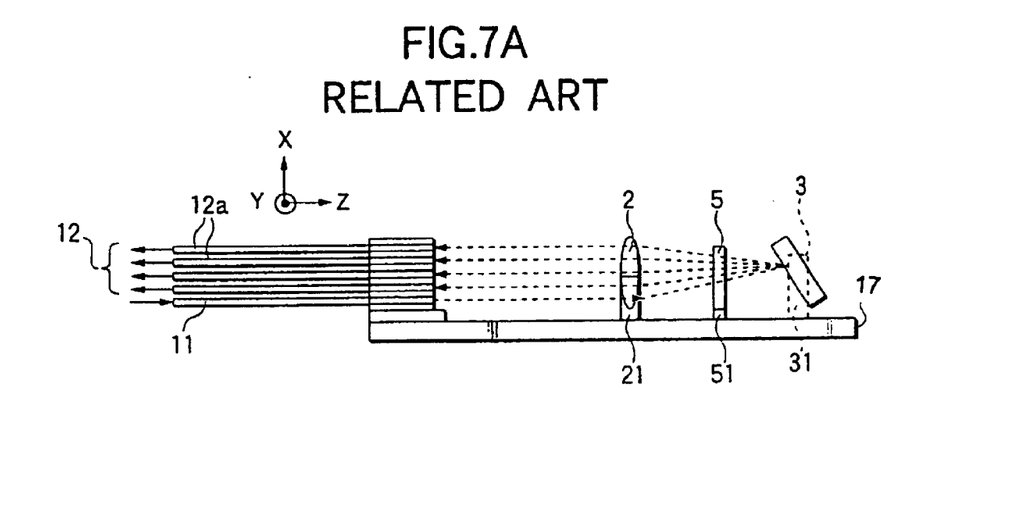
FIGS. 7A and 7B are a side sectional view and a plan view showing the configuration of a related-art optical module.
Figure 7B:
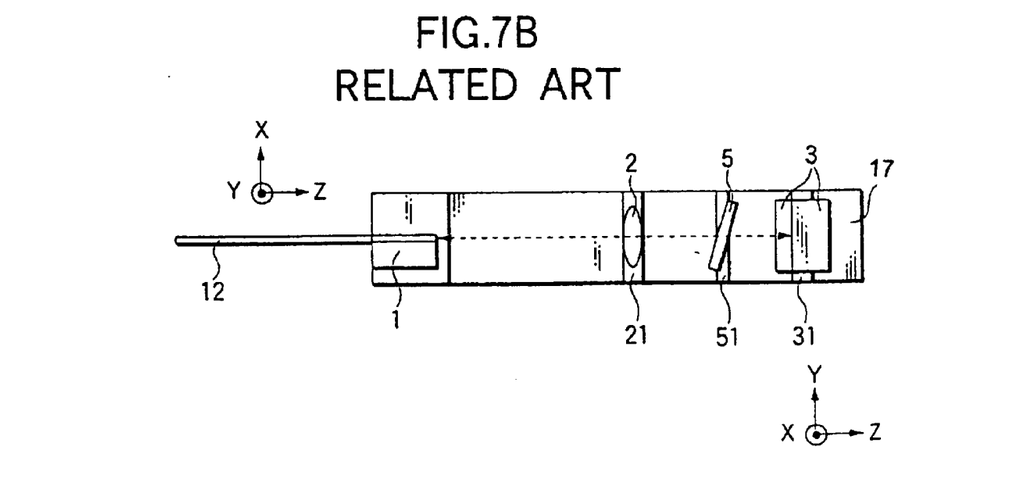

FIGS. 6A and 6B show an example of an optical multiplexing/demultiplexing device which has a diffraction grating provided in Littrow mounting and which is mounted in a box-shaped package having one surface opened. FIGS. 7A and 7B show another example of the optical multiplexing/demultiplexing device which is mounted on a plane base. These examples are illustrated by the present inventors for comparison purpose with the present invention.

In FIGS. 6A and 6B, an input/output optical fiber array 1, a diffraction grating 3, a polarization compensating filter 5 and a collimator lens 2 are provided in a box-shaped package 18 having a top surface opened. The polarization compensating filter 5 is provided to compensate for the polarization dependency of the diffraction efficiency of the diffraction grating 3. The collimator lens 2 is provided to convert divergent light from an input optical fiber 11 into parallel light and converge diffracted parallel light from the diffraction grating 3 on respective optical fibers 12a of an output optical fiber array 12. Here, the diffraction grating 3, the polarization compensating filter 5 and the collimator lens 2 are aligned and fixed to the box-shaped package 18 through a diffraction grating fixing stage 31, a polarization compensating filter stage 51 and a collimator lens fixing platform 21 respectively, which are disposed on the bottom surface of the box-shaped package 18. The input/output optical fiber array 1 is provided with the input optical fiber 11 and the output optical fiber array 12. The output optical fiber array 12 has a plurality of optical fibers 12a. The box-shaped package 18 has such high rigidity that the shape of the package 18 can be retained against external force. Thus, it is possible to form an optical module which has a stable optical axis and which makes a stable operation against mechanical vibration and stress.

On the other hand, in FIGS. 7A and 7B, an input/output optical fiber array 1, a diffraction grating 3, a polarization compensating filter 5 and a collimator lens 2 are provided on a plane base 17 in the same manner as in FIGS. 6A and 6B. Here, the diffraction grating 3, the polarization compensating filter 5 and the collimator lens 2 are aligned and fixed to the plane base 17 through a diffraction grating fixing stage 31, a polarization compensating filter stage 51 and a collimator lens fixing platform 21, respectively. In this case, the plane base 17 is different from the box-shaped package 18 having one surface opened in FIGS. 6A and 6B in that the plane base 17 has open space. Accordingly, even in the case where small-sized optical components are used, units for finely adjusting the respective optical components, such as a micro-motion stage, can be disposed around the optical module easily. Thus, even in the case where the number of parts is large and even in the case where the optical components are small in size, the optical components can be aligned and fixed.

The related-art optical modules, however, have problems as follows.

That is, when the box-shaped package 18 having one surface opened as shown in FIGS. 6A and 6B is used, the optical components are fixed to the bottom surface of the box-shaped package 18 so that there is a space between each of the optical components and each of the opposite side surfaces of the box-shaped package. Thus, the package becomes large in size compared with the optical components. In addition, though an optical system stable against disturbance such as mechanical vibration or heat shock can be produced in the box-shaped package 18 having one surface opened, each of the optical components cannot be finely adjusted through surface sides but the open surface side. Hence, to align a large number of small-sized optical components densely and accurately, finely adjusting mechanisms such as micro-motion stages interfere with one another mechanically. Thus, it is difficult to finely adjust the plurality of optical components simultaneously, and hence it is difficult to assemble them. In addition, it takes much time to set up the components.

On the other hand, when the plane base 17 shown in FIGS. 7A and 7B is used, the optical components are fixed to the plane base 17 so that there is a distance between each of the optical components and each of the end surfaces of the plane base 17. Thus, the package becomes large in size compared with the optical components. In the case of the plane base 17 there is indeed a space around the optical system so that mechanisms which can finely adjust a plurality of optical components simultaneously can be disposed around the optical module, unlike the case shown in FIGS. 6A and 6B. The plane base 17, however, has a structure in which an optical path as a whole is retained by the surface of the plane base 17, so that the total rigidity of the optical module is lowered. In addition, since the optical components are one-sidedly supported by only the bottom surface of the plane base 17, vibration sympathetic with external vibration is amplified so that the optical axis is apt to fluctuate in response to mechanical vibration and external force. Particularly, when the optical path is made long because of increase in the number of parts, optical stability is apt to be lowered. In addition, to solve this problem, it is necessary to make the plane base 17 very thick. Thus, it is difficult to miniaturize the optical module.

The invention is developed in consideration of such problems in the related art. It is an object of the invention to provide a small-sized optical module in which a large number of small-sized optical components is adjusted and aligned accurately while the optical module makes a stable operation against harsh external force or mechanical vibration and thermal disturbance for use in optical communication.

In case of the optical module shown in FIGS. 6A and 6B, the box-shaped package 18 is so high in rigidity that the box-shaped package 18 cannot be deformed or broken easily even in the case where mechanical impact particularly in a drop test is applied on the box-shaped package 18. The impact is, however, transmitted directly to the respective optical components mounted and fixed inside the box-shaped package 18 by the adhesive agent, so that the optical components may be dropped out due to the separation of the adhesive agent. In addition, when the box-shaped package 18 is made of low expansion glass such as pyrex glass which is a material having a small linear expansion coefficient, thermal stability is excellent but the box-shaped package itself is broken in a drop test carried out on the related-art optical module, so that the related-art optical module loses its function.

Figure 8A:
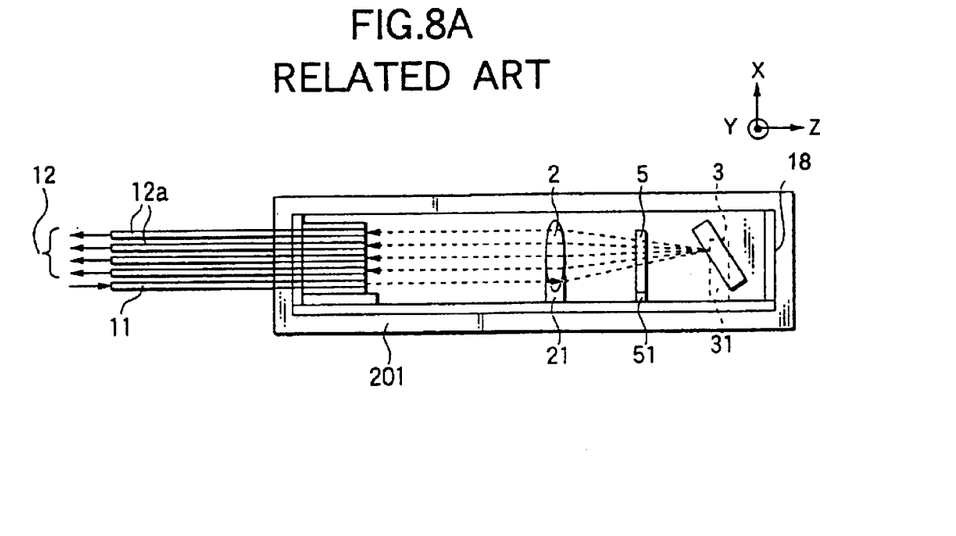
FIGS. 8A and 8B are a plan view and a side sectional view showing the configuration of a related-art optical module.
Figure 8B:
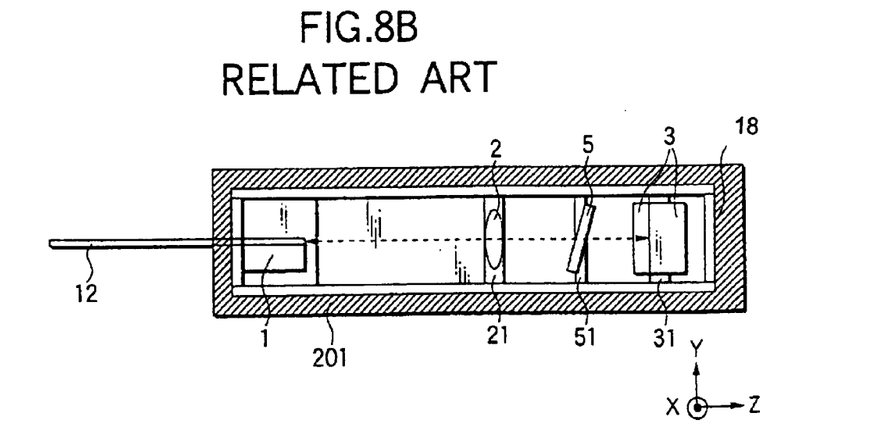

On the other hand, it is easy to carry out a method of covering the box-shaped package 18 wholly with a resin casing 201 as shown in FIGS. 8A and 8B. It is, however, necessary to make the resin 1 mm or more thick. As a result, the optical module becomes so thick that it is difficult to mount the optical module on one of electric printed boards arrayed on a stand at narrow intervals of 12.7 mm (a half inch).

Further, when only the optical system of the optical module is to be exchanged to a new one so as to afford a higher function to the optical module, or when a portion of the optical system is to be exchanged to a new one because of a failure in the optical module, it is impossible to exchange only the mounting portion of the optical system to a new one. Hence, the package portion which need not be exchanged to a new one originally cannot help being exchanged to a new one when the mounting portion of the optical system is exchanged to a new one.

The invention is developed in consideration of such problems in the related art. It is an object of the invention to provide a micro-optics type optical module which is constituted by a lens, a diffraction grating, a filter, and so on, chiefly for use in optical communication and which has properties stable against mechanical impact and is thin enough to be mounted on an electric printed board. It is another object of the invention to provide an optical module in which only a required portion can be exchanged to a new one for the improvement of the function or at the time of a failure.

SUMMARY OF THE INVENTION (1) To attain the foregoing objects, according to the present invention, there is provided and optical module having: a frame having rigidity; at least one optical component provided on opposite side surfaces of the frame and selected from the group consisting of a lens, a plane mirror, a concave mirror, a filter, a diffraction grating, a prism, and a holographic optical element; and an optical input/output unit provided on a light-transmissible surface as at least one surface of the frame.

(2) According to another gist of the invention, in the optical module as in (1), the frame has open surfaces provided as its two opposite surfaces.

(3) According to a further gist of the invention, in the optical module as in (2), a reinforcing unit is provided on the open surfaces of the frame for retaining a shape of the frame against external force.

(4) According to a still further gist of the invention, in the optical module as in any one of (1) to (3), the optical input/output unit includes at least one member selected from the group consisting of an optical fiber, an optical fiber array, a light-receiving element array, and a light-emitting element array.

(5) According to another gist of the invention, in the optical module as in any one of (1) to (4), the optical component is fixed to at least one of the frame and the reinforcing unit.

(6) According to a further gist of the invention, in the optical module as in any one of (1) to (5), the optical component has opposite side surfaces fixed to the opposite side surfaces of the frame.

(7) According to a still further gist of the invention, in the optical module as in any one of (1) to (6), a distance between the opposite side surfaces of the optical component is equal to a distance between the opposite side surfaces of the frame.

(8) According to another gist of the invention, in the optical module as in any one of (1) to (7), the frame is a rectangular frame.

(9) According to another gist of the invention, in the optical module as in any one of (1) through (8), the frame is an inner frame, and said module further comprises an outer frame containing therein said inner frame.

(10) According to another gist of the invention, in the optical module as in (9), an elastic body is further provided between said outer and inner frames.

(11) According to a further gist of the invention, there is provided a method for producing an optical module, having the steps of: inserting an optical component into a frame having two opposite open surfaces, through the open surfaces; adjusting and aligning the optical component; and fixing opposite side surfaces of the optical component to opposite side surfaces of the frame.

Thus, according to the invention, an optical component is fixed to opposite side surfaces of a frame having rigidity and a low linear expansion coefficient, so that a small-sized optical module can be produced. Moreover, since the frame high in rigidity and low in linear expansion coefficient is used, it is possible to produce an optical module capable of making a stable operation against external force or mechanical vibration and thermal disturbance. Moreover, since a reinforcing unit is fixed to the frame, the rigidity of the frame can be enhanced more greatly. In addition, when a frame provided with two open surfaces is used, a large number of small-sized optical components can be finely adjusted and assembled.

(12) To attain the foregoing object, according to a gist of the invention, there is provided an optical module having: an outer frame; an inner frame provided inside the outer frame and containing an optical system mounted therein; and an elastic body provided between the inner frame and the outer frame, wherein the inner frame is fixed to the outer frame through the elastic body.

(13) According to another gist of the invention, in the optical module as in (12), the outer frame is provided with open surfaces in two opposite surfaces, said open surfaces being wholly covered with the elastic body.

(14) According to a further gist of the invention, in the optical module as in (12) or (13), the open surfaces are covered with at least one member selected from the group consisting of a metal thin film, a film coated with a metal thin film, and a water-impermeable and water-vapor-impermeable film.

(15) According to a still further gist of the invention, in the optical module as in any one of (12) to (14), the inner frame is connected to at least one of optical fibers and electric wires, and the outer frame includes a dividing unit for nipping and pressure-fixing the at least one of optical fibers and electric wires.

(16) According to another gist of the invention, in the optical module as in any one of (12) to (15), the inner frame is made of low expansion glass.

(17) According to a further gist of the invention, in the optical module as in any one of (12) to (16), the shortest side of the optical module is not longer than 12.7 mm.

(18) According to a still further gist of the invention, in the optical module as in any one of (12) to (17), the elastic body is provided so that the elastic body can be separated from at least one of the outer frame and the inner frame when the elastic body is drawn.

Thus, according to the invention, the optical module has a structure in which the inner frame containing optical components such as a lens, a diffraction grating and a filter mounted therein is fixedly retained to the outer frame through the elastic body. Thus, it is possible to produce an optical module which has properties stable against mechanical impact and which is thin enough to be mounted on one of electric printed boards disposed at narrow intervals. Further, it is possible to produce an optical module in which only a required portion can be exchanged to a new one for the improvement of the function or at the time of a failure.

The present disclosure relates to the subject matter contained in Japanese patent application Nos. 2001-70701 and 2001-70749 (both filed on Mar. 13, 2001), which are expressly incorporated herein by reference in their entireties.

DESCRIPTION OF THE PREFERRED EMBODIMENT

Embodiment of the invention will be described below with reference to the drawings.

First Embodiment

Figure 1A:
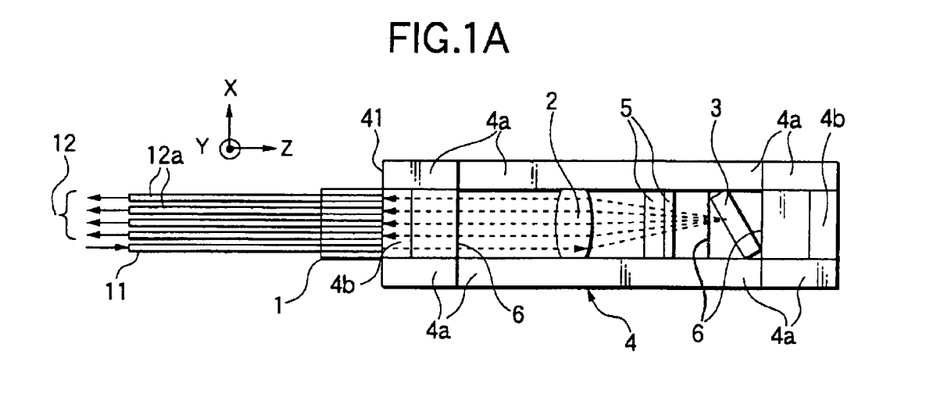
FIGS. 1A and 1B are a plan view and a side sectional view showing the configuration of an optical module according to an embodiment of the invention.
Figure 1B:
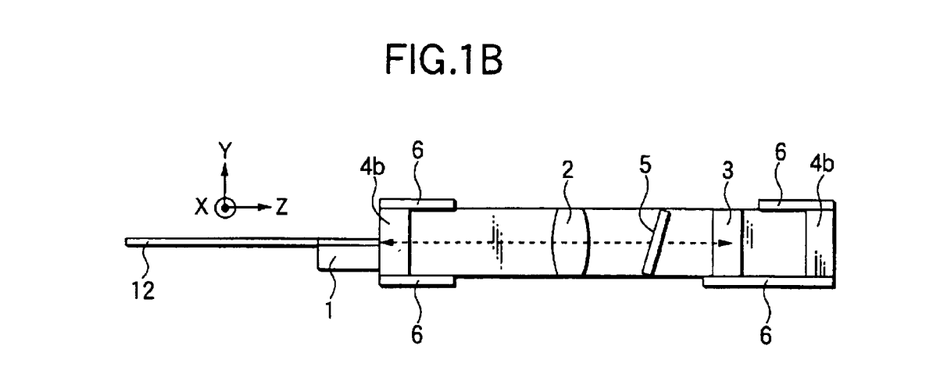

FIGS. 1A and 1B are a plan view and a side sectional view showing the configuration of an optical module according to this embodiment. This optical module has a rectangular frame 4 as a frame, an input/output optical fiber array 1 as an optical input/output unit, a collimator lens 2 as a lens, a polarization compensating filter 5 as a filter, a diffraction grating 3, and reinforcing members 6 as a reinforcing unit. The rectangular frame 4 has open surfaces provided in two opposite surfaces (top and bottom surfaces as two surfaces crossing the Y-direction perpendicularly in this embodiment). In addition, the rectangular frame 4 is made of a material having rigidity.

An input optical fiber 11 and an output optical fiber array 12 are provided in the input/output optical fiber array 1. The output optical fiber array 12 is provided with a plurality of optical fibers 12a. The collimator lens 2 converts divergent light from the input optical fiber 11 into parallel light and converges diffracted parallel light from the diffraction grating 3 on core end faces of the respective optical fibers 12a of the output optical fiber array 12. The polarization compensating filter 5 compensates for the polarization dependency of the diffraction efficiency of the diffraction grating 3. One or more reinforcing members 6 (in this embodiment, two on the top surface and two on the bottom surface) are fixedly bonded to the open surfaces of the rectangular frame 4 in order to prevent the rectangular frame 4 from being deformed by external force acting obliquely on the rectangular frame 4.

Here, the input/output optical fiber array 1 is fixed to a light-transmissible surface 41 provided as one surface of the rectangular frame 4. The collimator lens 2 and the polarization compensating filter 5 are inserted into the rectangular frame 4 through the open surfaces of the rectangular frame 4, and opposite side surfaces of the collimator lens 2 and opposite side surfaces of the polarization compensating filter 5 are fixedly bonded to the side surfaces of the rectangular frame 4. In addition, while the diffraction grating 3 is rotated around the Y-axis, the diffraction grating 3 is adjusted angularly as follows. First, the bottom surface of the diffraction grating 3 is fixedly bonded to the reinforcing member 6. Then, the diffraction grating 3 is aligned. Finally, the reinforcement members 6 are fixed to the open surfaces of the rectangular frame 4.

This optical module performs optical multiplexing/demultiplexing as follows. Emitted light with wavelengths $\lambda_1, \lambda_2, \ldots,$ and $\lambda_n$ multiplexed becomes divergent light after it emerges from the light-transmissible surface 41 to which the input optical fiber 11 is fixed. This divergent light is condensed by the collimator lens 2 and divided by the diffraction grating 3 into ray groups ($\lambda_1, \lambda_2, \ldots,$ and $\lambda_n$) in accordance with wavelengths having respective desired diffraction angles. The polarization compensating filter 5 compensates for the diffraction efficiency difference between s-polarization and p-polarization of the diffraction grating. The collimator lens 2 converges and coupled the luminous flux with the respective wavelengths again onto the core end faces of the optical fibers 12a respectively in the output optical fiber array 12. Thus, outputs are obtained. Here, the lines from the input optical fiber 11 down to the diffraction grating 3 and from the diffraction grating 3 up to the respective optical fibers 12a of the output optical fiber array 12 designate main rays.

The distance between opposite side surfaces of each of the collimator lens 2 and the polarization compensating filter 5 is substantially equal to the distance between the opposite side surfaces of the rectangular frame 4. There is, however, a margin enough to allow these optical components to move between the opposite side surfaces of the rectangular frame 4. The optical components are inserted in the rectangular frame 4 through the two opposite open surfaces of the rectangular frame 4. After the optical components are adjusted and aligned, the opposite side surfaces of each of the optical components are fixed to the side surfaces of the rectangular frame 4.

In this manner, the optical module in this embodiment uses the rectangular frame 4 having two opposite open surfaces. Accordingly, optical components can be inserted in the rectangular frame 4 through the open surfaces easily, so that a finely adjustable, highly accurate and highly functional optical module can be assembled and mounted. In addition, since the rectangular frame 4 is reinforced with the reinforcing members 6 so as to be prevented from deformation, the optical axis can be stabilized against disturbance such as mechanical vibration.

Further, in this embodiment, low expansion glass (Tempax made by Schott Corporation) is used for the rectangular frame 4 and the reinforcing members 6 so that the structure of the optical system in the Z-direction becomes stable even against temperature changes. The external dimensions of the rectangular frame 4 are 20 mm in width (in the X-direction), 7 mm in height (in the Y-direction) and 80 mm in total length (in the Z-direction). Further, the rectangular frame 4 is produced by bonding two rectangular parallelepipeds 4a measuring 4 mm thick by 7 mm high by 80 mm long to two rectangular parallelepipeds 4b measuring 4 mm thick by 7 mm high by 12 mm long. Although the rectangular frame 4 is produced by the combination of four rectangular parallelepipeds in such a manner in this embodiment, the respective rectangular parallelepipeds may be fixed by fitting through hooks provided in the rectangular parallelepipeds. In addition, the mode of division of the frame is not limited to this, but the shape may be trapezoidal. The rectangular frame 4 as a whole may be produced by integral molding.

The optical module according to this embodiment was installed on a stand with a cooling fan, and the input optical fiber 11 and the output optical fiber array 12 were mounted on the stand at a distance of about 10 mm from the optical module. Then, a change of the optical output was measured. In addition, for comparison with this embodiment, a change of the optical output was measured on an optical module in which optical components were fixed on the plane base 17 as shown in FIGS. 7A and 7B. In this case, the thickness of the plane base 17 was set to 4 mm, and low expansion glass (Tempax) was used. The whole length of the optical system was set to 80 mm, and the collimator lens 2 and the polarization compensating filter 5 were self-supported and fixedly bonded on one side of the plane base 17. In addition, the reinforcing members 6 shown in FIGS. 1A and 1B were bonded to the plane base 17 so that the diffraction grating 3 was retained in the same manner as shown in FIGS. 1A and 1B.

As a result of comparison of stability in such a manner, there was no recognized variation in the output in the configuration according to this embodiment shown in FIGS. 1A and 1B. On the other hand, a variation of about 0.2 dB was measured in the configuration shown in FIGS. 7A and 7B. Thus, the effect according to this embodiment could be confirmed.

Incidentally, the optical module according to this embodiment is so small that the shortest side of the rectangular frame is 7 mm long. Accordingly, the optical module can be mounted easily even on a stand having a large number of electric printed boards provided at narrow intervals of 12.7 mm (a half inch).

According to this embodiment configured as described above, the following operations and effects can be obtained.

(1) Since the opposite side surfaces of each of optical components are fixed to the opposite side surfaces of a rectangular frame respectively, a rectangular frame having a length obtained by adding the thickness of the opposite side surfaces of the rectangular frame to the distance between the opposite side surfaces of each of the optical components can be used so that the optical module can be miniaturized.

(2) Since the rectangular frame high in rigidity and small in linear expansion coefficient is used, deformation caused by external force can be restrained, and thermal change can be also restrained.

(3) Since open surfaces are provided as the two opposite surfaces of the rectangular frame, optical components can be inserted easily into the rectangular frame through these open surfaces. Moreover, the optical components inserted into the rectangular frame can be adjusted and aligned easily through the open surfaces. That is, an optical module constituted by a large number of small-sized optical components can be produced easily and accurately.

(4) Since reinforcing members are provided on the rectangular frame, the deformation of the rectangular frame caused by external force can be further restrained.

(5) Since the reinforcing members can be also used for fixing the optical components, the optical components can be adjusted and aligned when the positions of attachment of the reinforcing members having the optical components fixed thereto to the rectangular frame are adjusted.

Incidentally, the embodiment may be modified as other modes to be carried out as follows.

Although the embodiment has shown the case where the rectangular frame 4 is used, the invention may be applied also to the case where a frame having opposite side surfaces parallel to each other and having end portions curved is used. That is, any frame can be used if the frame has side surfaces opposite to each other.

Figure 2A:
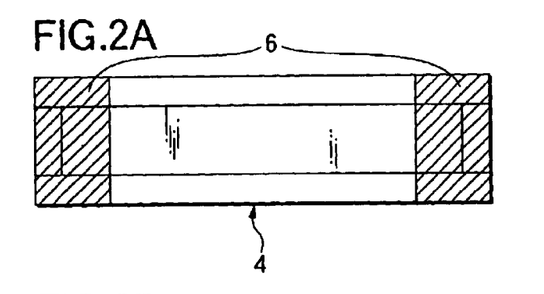
FIGS. 2A to 2F are plan views showing the shapes of reinforcing members for reinforcing a frame of the optical module according to the embodiment.
Figure 2B:
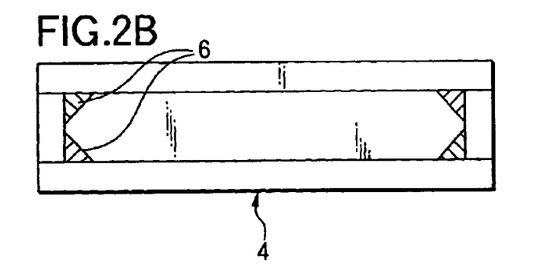
Figure 2C:
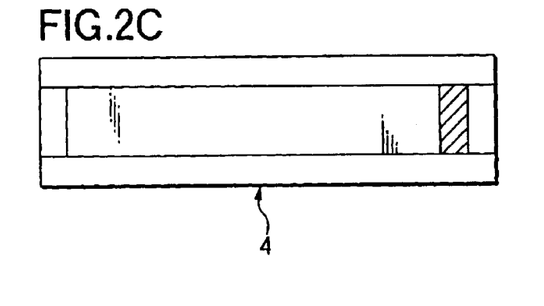
Figure 2D:
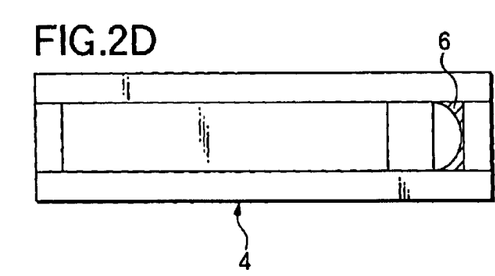
Figure 2E:
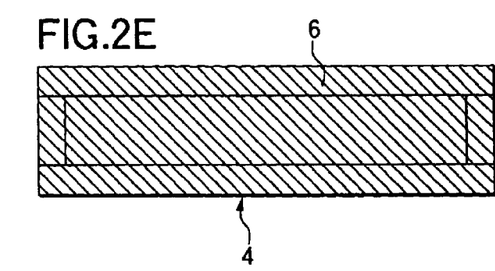
Figure 2F:
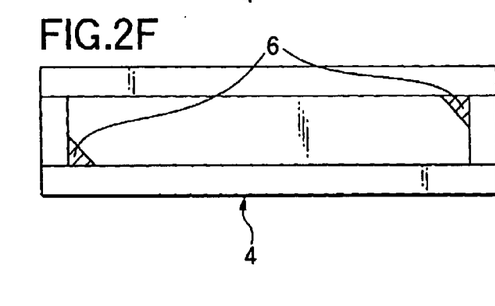

Although the embodiment has shown the case where quadrangular plates as the reinforcing members 6 are fixed to four corners of the rectangular frame 4 as shown in FIGS. 1A, 1B and 2A, the shapes and mounting positions of the reinforcing members are not limited there to. For example, triangular reinforcing members may be provided in four inner corners of the rectangular frame (FIG. 2B), or a quadrangular reinforcing member may be provided in an inner side of the rectangular frame 4 (FIG. 2C), or a curved reinforcing member may be provided in a corner of the rectangular frame (FIG. 2D), or a reinforcing member may be provided to cover the whole of an open surface of the rectangular frame (FIG. 2E) For example, triangular reinforcing members may be provided in two opposite corners (FIG. 2F). That is, the reinforcing members have a structure to prevent the rectangular frame 4 from being deformed by oblique stress and can be provided in any region except the light-transmitting region of the light-transmissible surface through which light comes in and goes out.

Although the embodiment has shown the case where low expansion glass is used for the rectangular frame 4 so that the light-transmissible surface 41 is light-transmissible as a whole, the invention may be applied also to the case where only the region on which the input optical fiber 11 and the output optical fiber array 12 are installed is light-transmissible.

Although the embodiment has shown the case where low expansion glass is used for the rectangular frame 4 and the reinforcing members 6, the invention may be applied also to the case where ceramics, metal or plastics is used. That is, any material may be used if the quantity of deformation of the material caused by external force is low enough to keep optical properties of the material.

Although the embodiment has shown the case where the input/output optical fiber array 1 constituted by the input optical fiber 11 and the output optical fiber array 12 is used as an optical input/output unit, the invention may be applied also to the case where a light-receiving element array such as a photodiode array is used in place of the output optical fiber array 12. In this case, light-receiving elements for receiving light with respective wavelengths are arrayed in positions where luminous flux with the respective wavelengths are converged.

Although the embodiment has shown the case where the optical module is used as a demultiplexer in which multiplexed light emitted from the input optical fiber 11 is demultiplexed by the diffraction grating into rays to be supplied to the respective optical fibers 12a of the output optical fiber array 12, the invention may be applied also to the case where the optical module is used as a multiplexer instead of a demultiplexer. That is, the output optical fiber array 12 may be replaced by an input optical fiber array. In this case, light with respective wavelengths entering optical fibers 12a of the input optical fiber array 12 may be multiplexed by the diffraction grating 3, and the multiplexed rays maybe outputted from an output optical fiber provided in place of the input optical fiber 11.

Alternatively, when the optical module is used as a multiplexer, a light-emitting element array such as a laser diode array may be provided in place of the output optical fiber array 12. In this case, light with respective wavelengths emitted from the light-emitting element array may be multiplexed by the diffraction grating 3, and the multiplexed rays may be outputted from an output optical fiber provided in place of the input optical fiber 11.

Further, since the optical module can be used both as a multiplexer and as a demultiplexer, a light-receiving light-emitting element array constituted by a mixture of light-emitting elements and light-receiving elements may be provided in place of the combination of the input optical fiber 11 and the output optical fiber array 12.

As described above, in accordance with the invention, optical components are fixed to opposite side surfaces of a frame. Thus, it is possible to provide a small-sized module in which extra space is suppressed. Moreover, because the frame used is high in rigidity and small in linear expansion coefficient, it is possible to provide an optical module which can make a stable operation against harsh external force or mechanical vibration and thermal disturbance for use in optical communication.

In addition, when a frame provided with two open surfaces is used, a plurality of small-sized optical components can be aligned and fixed by fine adjustment. When the frame having two open surfaces is used, the rigidity of the optical module can be enhanced by providing reinforcing members on the frame.

Second Embodiment

An optical module according to a second embodiment of the invention will be described with reference to FIGS. 3A and 3B. The frame 4 used in the first embodiment is used as an inner frame 4 in the second embodiment, and the second embodiment further uses an outer frame 106.

Figure 3A:
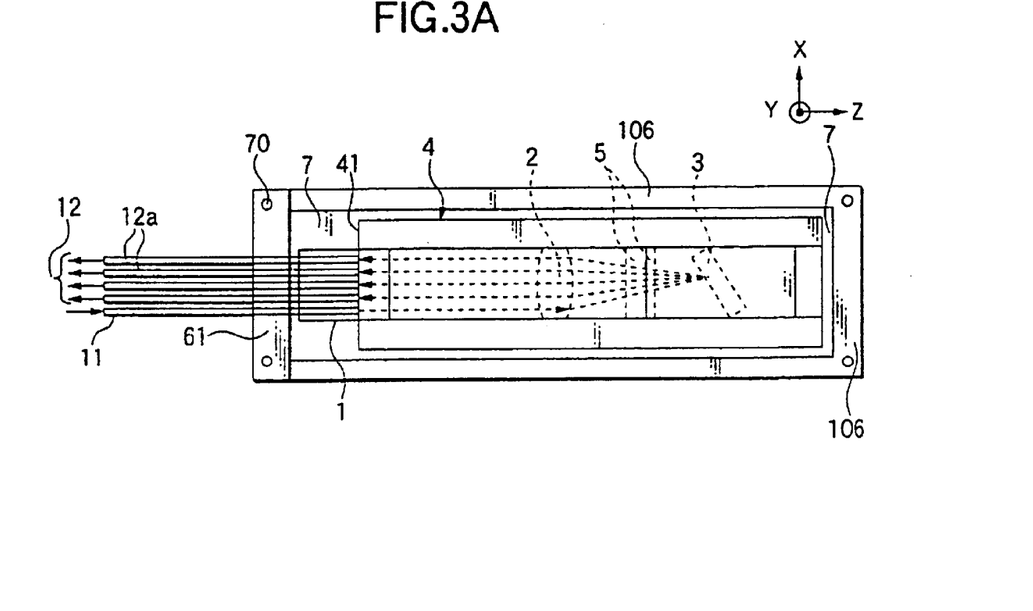
FIGS. 3A and 3B are a plan view and a side sectional view showing the configuration of an optical module according to a second embodiment of the invention.
Figure 3B:
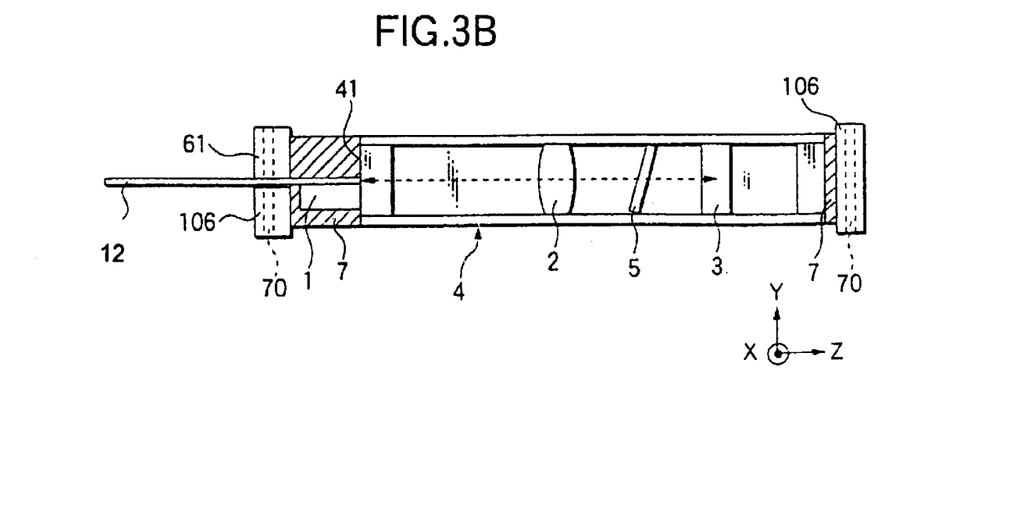

FIGS. 3A and 3B are a plan view and a side sectional view showing the configuration of an optical module according to this embodiment. This optical module has an inner box, i.e. an inner frame, 4, an elastic body 7 provided on side surfaces of the inner box 4, an outer frame 106 provided on side surfaces of the elastic body 7, and an input/output optical fiber array 1 fixed to a light-transmissible surface 41 provided in the inner frame 4. The inner frame 4 is fixed to the outer frame 106 through the elastic body 7. As shown in FIGS. 3A and 3B, the elastic body 7 is provided only on the side surfaces of the inner frame 4 but not provided on the top and bottom surfaces of the inner frame 4 (in which two surfaces crossing the Y-axis perpendicularly in FIGS. 3A and 3B are regarded as the top and bottom surfaces respectively). In addition, open surfaces are provided in two opposite surfaces (which are two surfaces crossing the Y axis perpendicularly in FIGS. 3A and 3B) of the outer frame 106. That is, the outer frame 106 has a structure in which the outer frame 106 does not touch the inner frame 4 but touches only the elastic body 7.

A collimator lens 2, a polarization compensating filter 5 and a diffraction gratng 3 are provided in the inner frame 4, and these components are fixedly bonded to the inner frame 4. The collimator lens 2 converts divergent light from the input optical fiber 11 into parallel light and converges diffraction parallel light from the diffraction grating 3 on respective optical fibers 12a of an output optical fiber array 12. The polarization compensating filter 5 compensates for the polarization dependency of the diffraction efficiency of the diffraction grating 3. The input optical fiber 11 and the output optical fiber array 12 are provided in the input and output optical fiber array 1. The output optical fiber array 12 has a plurality of optical fibers 12a.

The optical module is fixed to an electric printed board by screws (not shown) inserted into a plurality of holes 70 (four holes in this embodiment) such as threaded holes provided in the outer frame 106. In the configuration, the inner box 4 provided with the optical system is floated, through the elastic body 7, with respect to the outer frame 106 fixed to the electric printed board or the like. Hence, it is possible to block the influence of mechanical impact or vibration on the optical system.

This optical module performs optical multiplexing/demultiplexing as follows. Emitted light with wavelengths $\lambda_1, \lambda_2, \ldots,$ and $\lambda_n$ multiplexed becomes divergent light after it emerges from the light-transmissible surface 41 to which the input optical fiber 11 is fixed. This divergent light is condensed by the collimator lens 2 and divided by the diffraction grating 3 into ray groups $(\lambda_1, \lambda_2, \ldots, \lambda_n)$ in accordance with wavelengths having desired diffraction angles respectively. The polarization compensating filter 5 compensates for the diffraction efficiency difference between s-polarization and p-polarization of the diffraction grating. The collimator lens 2 converges and couples the luminous flux with the respective wavelengths again on core end faces of the optical fibers 12a, respectively, in the output optical fiber array 12. Thus, outputs are obtained. Here, the lines from the input optical fiber 11 down to the diffraction grating 3 and from the diffraction grating 3 up to the respective optical fibers 12a of the output optical fiber array 12 designate main rays.

Low expansion glass (Tempax made by Schott Corporation) excellent in surface evenness and having a linear expansion coefficient of $3.5 \times 10^{-6}/°$ C. was used for the inner frame 4. In addition, the inner frame 4 was constituted by a combination of a frame and two plates. The frame was formed by bonding and fixing two rectangular parallelepipeds measuring 4 mm thick by 5.5 mm high by 80 mm long and two rectangular parallelepipeds measuring 4 mm thick by 5.5 mm high by 12 mm long. The two plates were 1 mm thick and fixedly bonded to the upper and bottom surfaces of the frame. The internal dimensions of the inner frame 4 were 12 mm in width (in the X-direction in FIGS. 3A and 3B), 72 mm in length (in the Z-direction likewise) and 5.5 mm in height (in the Y-direction likewise), so that an-enough height (5.5 mm) for the optical path is secured. On the other hand, the external dimensions of the inner frame 4 were 20 mm in width, 80 mm in length and 7.5 mm in height. As a result, the height of the optical module (length in the Y-direction in FIG. 3B) in which the outer frame 106 was added to the inner frame 4 could be made 8 mm. Thus, the optical module could be mounted on one of electric printed boards arrayed at narrow intervals of 12.7 mm on a stand.

Polyacetal (linear expansion coefficient: $8.5 \times 10^{-5}/°$ C.) was used for the outer frame 106. Polyphenylene oxide (linear expansion coefficient: $2.7 \times 10^{-5} /°$ C.) may be used instead.

A sealing compound made of polyurethane (Pel-Urethane Model MU-102 made by Nippon Pelnox Corporation, with a linear expansion coefficient of $22 \times 10^{-5}/°C$.) was used for the elastic body 7.

The elastic body 7 of the optical module in this embodiment was produced as follows. First, a spacer jig (not shown) made of Teflon having the same internal dimensions as those of the outer frame 106 and having a predetermined height was disposed on the upper and bottom surfaces of the inner frame 4. Then, the input/output optical fiber array 1 was fixed by the outer frame 106 and a dividing/capping portion 61 as a dividing unit. Then, a dispenser was used so that the sealing compound made of polyurethane was charged in between the outer frame 106 and the inner frame 4 through a hole provided in the spacer jig. Then, the sealing compound was hardened on a hot plate at 60° C. for 2 hours. Since the spacer jig was made of Teflon, the spacer jig could be removed easily from the hardened elastic body. Thus, the elastic body 7 shown in FIGS. 3A and 3B could be formed.

The optical module produced thus was subjected to a drop test in which the optical module was dropped from a height of 1 m. As a result, it could be confirmed that there was no recognized damage in the inner frame 4 and that there was no change in the optical properties.

After this test, the dividing/capping portion 61 was removed and then the inner frame 4 was pressed from its one side while a cutter knife was inserted between the outer frame 106 and the elastic body 7. As a result, the inner frame 4 and the outer frame 106 could be separated from each other. Further, after the elastic body 7 adhering to the circumference of the inner frame 4 was partially cut with the cutter knife, the elastic body 7 was pulled and drawn. As a result, the elastic body 7 could be removed from the circumference of the inner frame 4. In addition, an optical multiplexing/demultiplexing module optical system mounted in another inner frame 4 was mounted on this outer frame 106 in the manner described above and subjected to a similar drop test. As a result, it could be confirmed that there was no recognized damage in the inner frame 4 and that there was no change in the optical properties.

The embodiment has shown the case where polyurethane, low expansion glass and polyacetal are used for the elastic body 7, the inner frame 4 and the outer frame 106 respectively. These materials are, however, not limited to this specific combination. The elastic body 7 may be made of a material selected from a silicone resin, a rubber-based adhesive agent, a rubber O-ring, an elastic spacer, and so on. That is, any material may be used if it has elasticity and is capable of absorbing the linear expansion coefficient difference between the inner frame 4 and the outer frame 106 and capable of blocking external vibration, particularly vibration with a frequency close to the specific resonant frequency of the optical components provided in the inner frame.

In addition, the inner frame 4 is preferably made of a material represented by a metal material such as kovar or a liquid crystal polymer, which has a small linear expansion coefficient particularly with respect to the direction of the optical axis and which is low in cost and high in rigidity. On the other hand, a metal such as aluminum or magnesium, or a resin such as polyethylene or polycarbonate may be used for the outer frame 106. It is, however, desired that the material of the outer frame 106 is not deformed by mechanical impact and has a linear expansion coefficient close to that of the material of electric printed boards.

Further, it is preferable that the inner frame 4 and the outer frame 106 have low wettability to the elastic body 7 so that the inner frame 4 and the outer frame 106 can be separated easily from each other. It is, however, possible to use a high-wettability material if the material is coated with silicone oil to thereby reduce the wettability.

Because low expansion glass is used for the inner frame 4, the whole of the light-transmissible surface 41 transmits light. Another configuration, however, may be made if the region of installation of the input optical fiber 11 and the output optical fiber array 12 can transmit light.

According to the first embodiment configured as described above, the following operations and effects can be obtained.

(1) Since the inner frame 4 containing the optical system mounted therein is fixedly retained to the outer frame 106 through the elastic body 7, the change of the properties due to mechanical impact can be suppressed.

(2) Since there is no elastic body provided on the outer circumference of the outer frame 106, the thickness of the optical module can be prevented from increasing due to the thickness of the elastic body.

(3) Since the dividing/capping portion 61 is provided, the optical module can be disassembled and assembled easily, so that only a required portion can be exchanged to a new one for the improvement of the function or at the time of a failure.

(4) Since the optical module has a structure in which the inner frame 4 does not protrude from the outer frame 106, only the outer frame will suffer direct impact even if the optical module falls down to a floor. Thus, the impact to be applied on the inner frame 4 can be absorbed to the elastic body 7.

Third Embodiment

An optical module according to a third embodiment of the invention will be described with reference to FIGS. 4A and 4B.

Figure 4A:
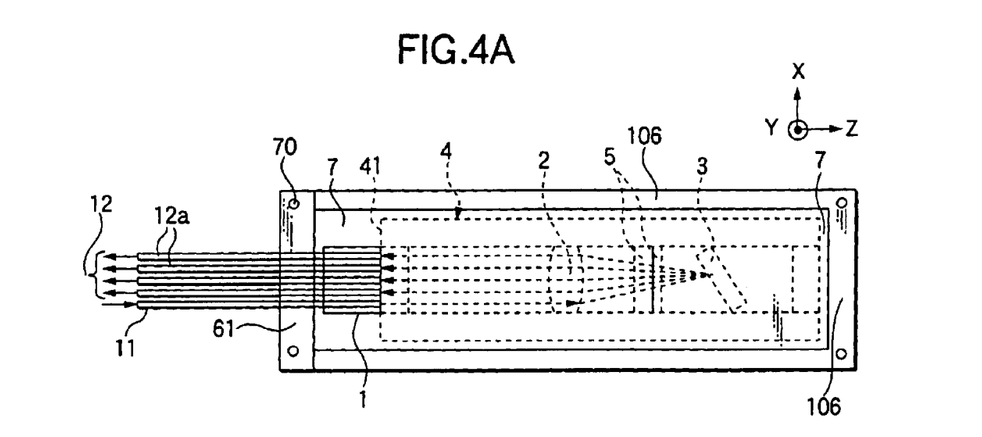
FIGS. 4A and 4B are a plan view and a side sectional view showing the configuration of an optical module according to a third embodiment of the invention.
Figure 4B:
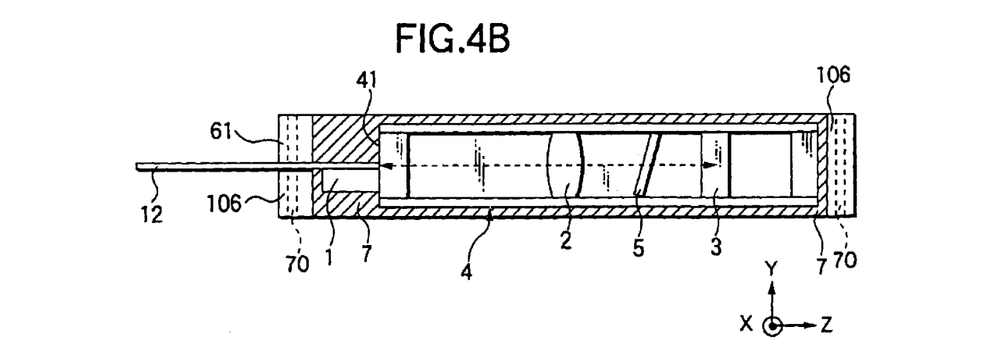

FIGS. 4A and 4B are a plan view and a side sectional view showing the configuration of an optical module according to this embodiment. Since the optical module according to this embodiment has constituent portions the same as those in the first and second embodiments, points of difference will be described chiefly.

In the optical module according to this embodiment, in addition to the elastic body 7 in the optical module according to the second embodiment, the elastic body is provided also on the top and bottom surfaces of the inner frame 4. That is, as shown in FIGS. 4A and 4B, the elastic body 7 is provided on the outer circumference (side, top and bottom surfaces) of the inner frame 4. On the other hand, the outer frame 106 is provided only on side surfaces of the elastic body 7 in the same manner as in the second embodiment, so that the top and bottom surfaces of the inner frame 4 are covered with the elastic body 7.

In this manner, the elastic body 7 is provided on the top and bottom surfaces of the inner frame 4. Hence, the inner frame 4 can be protected even in the case where a small external object collides with the optical module through an open surface of the outer frame 106.

It is desired that the elastic body 7 is thin enough not to protrude out from the outer frame 106. In this configuration, the height of the optical module can be reduced, so that a thin optical module can be produced.

According to the third embodiment configured as described above, the following operations and effects can be obtained in addition to the operations and effects described in (1) to (3) in connection with the second embodiment.

(5) Since the elastic body 7 is provided also on the top and bottom surfaces of the inner frame 4, the inner frame 4 can be protected by the elastic body 7 even in the case where impact is applied directly on the top and bottom surfaces of the inner frame 4.

Fourth Embodiment

An optical module according to a fourth embodiment of the invention will be described with reference to FIGS. 5A and 5B.

Figure 5A:
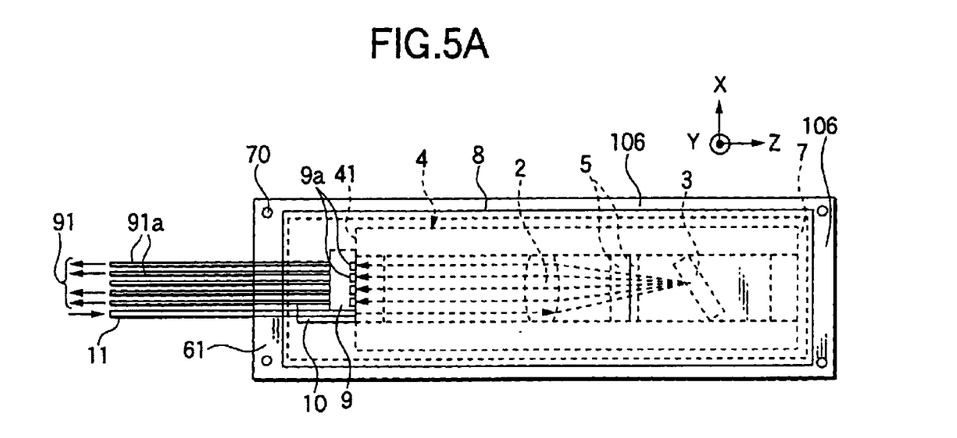
FIGS. 5A and 5B are a plan view and a side sectional view showing the configuration of an optical module according to a third embodiment of the invention.
Figure 5B:
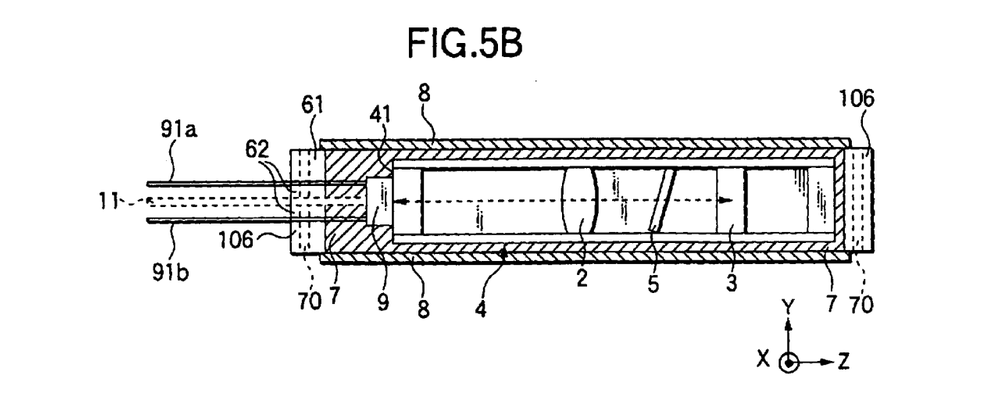

FIGS. 5A and 5B are a plan view and a side sectional view showing the configuration of an optical module according to this embodiment. Since the optical module according to the embodiment has constituent portions the same as those in the first, second and third embodiments, points of difference will be described chiefly.

In the optical module according to this fourth embodiment, a photo-detector array 9 is provided in place of the output optical fiber array 12 of the first embodiment. That is, the input optical fiber 11 and the photo-detector array 9 are provided in place of the input and output optical fiber array 1 of the second embodiment. This input optical fiber 11 is fixedly bonded to the light-transmissible surface 41 through a single-core fiber array After light emitted from the input optical fiber 11 is demultiplexed into rays by a diffraction grating 3, these demultiplexed rays are converted into electric signals by a plurality of photo-detectors 9*a* arrayed in positions corresponding to the respective wavelengths of these rays. The electric signals are led to the outside of the outer frame 106 through a plurality of electric wires 91 (two lines of electric wires 91*a* and 91*b* in this fourth embodiment). One line 91*a* and the other line 91*b* of electric wires are pressure-fixed together with the input optical fiber 11 into between the outer frame 106 and the dividing/capping portion 61 while the input optical fiber 11 is put between insulating spacers 62 for suppressing short-circuiting between the two lines of electric wires. That is, the two lines of electric wires 91*a* and 91*b* are configured to be extracted to the outside of the optical module.

Further, sealing films 8 are provided on the top and bottom surfaces of the optical module respectively. That is, the elastic body 7 not covered with the outer frame 106 and the outer frame 106 around the elastic body 7 in the third embodiment are covered with the sealing films 8 in this fourth embodiment. An aluminum tape about 50 $\mu$m thick is used as each of the sealing films 8. The sealing films 8 can prevent the inner frame 4 from being adversely affected by water or water vapor permeating the elastic body 7 with little change in thickness of the optical module.

In the configuration, the inner frame 4 can be floated, through the elastic body 7, with respect to the outer frame 106 while optical and electric interfaces are made. Thus, it is possible to block the influence of mechanical impact or vibration on the optical system. In addition, the optical module can be configured to be thin while prevented from being invaded by water vapor or the like. Thus, the optical module can be mounted on one of electric printed boards arrayed at narrow intervals of 12.7 mm on a stand.

After the optical module formed thus was subjected to a high-temperature high-humidity test in the condition of 75° C., 90% RH and 200 hours, the inner frame 4 was taken out in the same manner as described in the second embodiment and the inside of the inner frame 4 was observed. As a result, it was found that there was no dew condensation observed and that the sealing environment was kept good.

A material having no rigidity, such as a net wire, a thin film or a wire patterned on a flexible printed board, is preferably used as each of the electric wires 91 in order to prevent external vibration from being transmitted to the inner frame 4 through the electric wires themselves.

Although this fourth embodiment has shown the case where an aluminum tape is used as each of the sealing films 8, the invention may be applied also to the case where a film obtained by vacuum-depositing vapor of a material suppressing transmission of water vapor, such as aluminum or gold, on a resin or a metal thin film is used as each of the sealing films 8. Since the optical module is disposed between electric printed boards, it is desired that the outside of each of the sealing films 8 is coated with an insulating material or that a resin material is provided as a base on the outside of the sealing film 8.

Although this third embodiment has shown the case where the sealing films 8 are provided on the top and bottom surfaces of the optical module, the invention may be applied also to the case where a sealing film is provided on the outer circumference of the optical module.

According to the fourth embodiment configured as described above, the following operations and effects can be obtained in addition to the operations and effects described in (1) to (3) and (5) in connection with the second and third embodiments. (6) Since the sealing films 8 are provided on the outer circumference of the elastic body 7 not covered with the outer frame 106, the inner frame 4 can be prevented from being adversely affected by water or water vapor permeating the elastic body 7.

As described above, in accordance with the invention, there is provided a structure in which an inner frame containing a micro optics type optical module constituted by a combination of a lens, a diffraction grating, a filter, and so on, is fixedly retained to an outer frame through an elastic body. Accordingly, it is possible to provide an optical module which has properties stable against mechanical impact.

Moreover, since the elastic body is not provided on the outer circumference of the outer frame, it is possible to produce an optical module having dimensions corresponding to the external dimensions of the outer frame or to the dimensions obtained by adding the dimensions of the sealing films to the external dimensions of the outer frame. That is, it is possible to produce a thin optical module, which can be mounted on one of electric printed boards disposed at narrow intervals on a stand. Further, since a dividing/capping portion is provided, it is possible to disassemble and assemble the optical module easily. That is, since only a required portion can be exchanged to a new one for the improvement of the function or at the time of a failure, it is possible to provide an optical module in which waste can be reduced or recycled.

What is claimed is:

1. An optical module comprising:
   a rigid frame;
   at least one optical component provided in contact with opposite side internal surfaces of said frame and selected from the group consisting of a lens, a plane mirror, a concave mirror, a filter, a diffraction grating, a prism, and a holographic optical element; and
   an optical input/output unit provided on a light-transmissible wall of said frame so that a light path extends through the light-transmissible wall;
   wherein at least one open surface is formed in said frame; and
   wherein optical input and optical output are performed through a common surface.

2. An optical module according to claim 1, wherein the optical component has a surface coplanar with said open surface.

3. An optical module according to claim 2, further comprising a reinforcing member provided on said open surfaces of said frame for retaining a shape of said frame against external force.

4. An optical module according to claim 1, wherein said optical input/output unit includes at least one member selected from the group consisting of an optical fiber, an optical fiber array, a light-receiving element array, and a light-emitting element array.

5. An optical module according to claim 3, wherein said optical component is fixed to at least one of said frame and said reinforcing member.

6. An optical module according to claim 1, wherein said optical component has opposite side surfaces fixed to said opposite side internal surfaces of said frame.

7. An optical module according to claim 6, wherein a distance between said opposite side surfaces of said optical component is equal to a distance between said opposite side internal surfaces of said frame.

8. An optical module according to claim 1, wherein said frame is a rectangular frame.

9. An optical module as recited in claim 1 wherein said opposite side internal surfaces of said frame are substantially planar and parallel to each other.

10. An optical module comprising:
   a rigid inner frame;
   at least one optical component provided in contact with opposite side internal surfaces of said inner frame and selected from the group consisting of a lens, a plane mirror, a concave mirror, a filter, a diffraction grating, a prism, and a holographic optical element; and
   an optical input/output unit provided on a light-transmissible wall of said inner frame so that a light path extends through the light-transmissible wall;
   an outer frame contacting therein said inner frame; and
   an elastic body provided between said outer and inner frames.

11. An optical module according to claim 10, wherein the inner frame as at least one open surface and wherein the optical component has a surface coplanar with said open surface.

12. An optical module according to claim 11, further comprising a reinforcing member provided on said open surface of said inner frame for retaining a shape of said frame against external force.

13. An optical module according to claim 10, wherein said optical input/output unit includes at least one member selected from the group consisting of an optical fiber, an optical fiber array, a light-receiving element array, and a light-emitting element array.

14. An optical module according to claim 12, wherein said optical component is fixed to at least one of said inner frame and said reinforcing portion.

15. An optical module according to claim 10, wherein said optical component has opposite side surfaces fixed to said opposite side internal surfaces of said inner frame.

16. An optical module according to claim 15, wherein a distance between said opposite side surfaces of said optical component is equal to a distance between said opposite side internal surfaces of said inner frame.

17. An optical module according to claim 10, wherein said inner frame is a rectangular frame.

18. An optical module as recited in claim 10 wherein opposite side internal surfaces of said inner frame are substantially planar and parallel to each other.

19. An optical module as recited in claim 10 wherein optical input and optical output are performed through a common surface.

20. A method for producing an optical module, comprising the steps of:
   inserting an optical component into a frame having two opposite open surfaces, through said open surfaces such that an optical path associated with the optical component extends through a transparent wall of the frame;
   adjusting and aligning said optical component; and
   fixing opposite side surfaces of said optical component to opposite side surfaces of said frame.

21. An optical module comprising:
   an outer frame;
   an inner frame provided inside said outer frame and containing an optical system mounted therein, wherein the inner frame contains an optical component between opposite side internal surfaces; and
   an elastic body provided between said inner frame and said outer frame for blocking mechanical impact or vibration on said optical system;
   wherein said inner frame is fixed to said outer frame through said elastic body; and
   wherein said outer frame is provided with open surfaces on opposite sides, said open surfaces being wholly covered with said elastic body.

22. An optical module according to claim 21, wherein said open surfaces are covered with at least one member selected from the group consisting of a metal thin film, a film coated with a metal thin film, and a water-impermeable and water-vapor-impermeable film.

23. An optical module according to claim 21, wherein:
   said inner frame is connected to at least one of optical fibers and electric wires; and
   said outer frame includes a dividing unit for nipping and pressure-fixing at least one of optical fibers and electric wires.

24. An optical module according to claim 21, wherein said inner frame is made of low expansion glass.

25. An optical module according to claim 21, wherein a shortest side of said optical module is not longer than 12.7 mm.

26. An optical module according to claim 21, wherein said elastic body is provided so that said elastic body can be separated from at least one of said outer frame and said inner frame when said elastic body is drawn.

27. An optical module as recited in claim 21 wherein said opposite side internal surfaces of said inner frame are substantially planar and parallel to each other.

28. An optical module as recited in claim 21 wherein optical input and optical output are performed through a common surface.

* * * * *